United States Patent
Fong et al.

(10) Patent No.: US 11,080,228 B2
(45) Date of Patent: Aug. 3, 2021

(54) DISTRIBUTED RANDOM BINNING FEATURIZATION WITH HYBRID TWO-LEVEL PARALLELISM

(71) Applicant: International Business Machines Corporation, Armonk, NY (US)

(72) Inventors: Liana Liyow Fong, Yorktown Heights, NY (US); Wei Tan, Yorktown Heights, NY (US); Michael Witbrock, Yorktown Heights, NY (US); Lingfei Wu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 15/457,422

(22) Filed: Mar. 13, 2017

(65) Prior Publication Data

US 2018/0260361 A1 Sep. 13, 2018

(51) Int. Cl.
*G06F 15/80* (2006.01)
*G06N 20/00* (2019.01)
*G06F 15/76* (2006.01)

(52) U.S. Cl.
CPC .............. *G06F 15/80* (2013.01); *G06F 15/76* (2013.01); *G06N 20/00* (2019.01)

(58) Field of Classification Search
CPC ...... G06K 9/6249; G06N 20/00; G06F 15/80; G06F 15/76; G06F 7/582
See application file for complete search history.

(56) References Cited

U.S. PATENT DOCUMENTS

| 6,292,822 B1* | 9/2001 | Hardwick | G06F 8/451 |
| | | | 718/102 |
| 10,685,008 B1* | 6/2020 | Kurve | G10L 17/18 |
| 2008/0005532 A1* | 1/2008 | Liao | G06F 7/582 |
| | | | 711/217 |

(Continued)

FOREIGN PATENT DOCUMENTS

| JP | 2016-524216 A | 8/2016 |
| KR | 1020150088157 A | 7/2015 |

OTHER PUBLICATIONS

Rahimi, Ali. et al. "Random Features for Large-Scale Kernel Machines," Advances in Neural Information Processing Systems 20 (NIPS 2007), 2008, pp. 1174-1184. (Year: 2008).*

(Continued)

*Primary Examiner* — Miranda M Huang
*Assistant Examiner* — Yao D Huang
(74) *Attorney, Agent, or Firm* — Anthony Curro, Esq.; McGinn I.P. Law Group, PLLC (57) ABSTRACT

A random binning featurization process method, system, and computer program product for a distributed random binning featurization process on one or more multicore systems with a hybrid two-level parallelism, the method including in a training phase, receiving a first data matrix dividing the random binning featurization process into two orthogonal levels, in a high-level generating a randomized number of high-dimension grids and evenly partitioning the grids into nodes in a parallel system, and in a low-level, evenly partitioning dimensions in each grid to construct look-up tables of index vectors and compute a local feature matrix for each node.

14 Claims, 9 Drawing Sheets

(56) References Cited

U.S. PATENT DOCUMENTS

| | | | | |
|---|---|---|---|---|
| 2009/0006287 A1* | 1/2009 | Rahimi | .................. | G06N 20/00 706/12 |
| 2014/0040338 A1* | 2/2014 | Van Der Sluis | ........ | G06F 7/588 708/254 |
| 2015/0066157 A1* | 3/2015 | Karypis | ................ | G06F 9/4843 700/3 |
| 2015/0134413 A1* | 5/2015 | Deshpande | ........ | G06Q 30/0202 705/7.31 |
| 2015/0378696 A1* | 12/2015 | Boehm | ..................... | G06F 8/45 717/149 |
| 2016/0078282 A1 | 3/2016 | Lee et al. | | |

OTHER PUBLICATIONS

Reyes-Ortiz, Jorge L. et al. "Big Data Analytics in the Cloud: Spark on Hadoop vs MPI/OpenMP on Beowulf," Procedia Computer Science, vol. 53, 2015, pp. 121-130, ISSN 1877-0509. (Year: 2015).*

Wu, Lingfei et al. "Revisiting Random Binning Features: Fast Convergence and Strong Parallelizability," KDD '16 Proceedings of the 22nd ACM SIGKDD International Conference on Knowledge Discovery and Data Mining, Aug. 13-17, 2016, pp. 1265-1274 (Year: 2016).*

Rabenseifner et al., "Hybrid MPI/OpenMP Parallel Programming on Clusters of Multi-Core SMP Nodes," 2009 17th Euromicro International Conference on Parallel, Distributed and Network-based Processing, Weimar, 2009, pp. 427-436. (Year: 2009).*

Mel, et al. "The NIST Definition of Cloud Computing". Recommendations of the National Institute of Standards and Technology. Nov. 16, 2015.

Aakash Patil et al. "Hardware Architecture for Large Parallel Array of Random Feature Extractors applied to Image Recognition". Neurocomputing, Dec. 25, 2015.

* cited by examiner

DISTRIBUTED RANDOM BINNING FEATURIZATION WITH HYBRID TWO-LEVEL PARALLELISM

BACKGROUND

The present invention relates generally to a random binning featurization process method, and more particularly, but not by way of limitation, to a system, method, and computer program product for dividing a random binning featurization process into two orthogonal phases and a near-linear parallelization scheme.

Conventionally, the increasing size of modern datasets poses a significant challenge to the scalability of the Kernel methods. The conventional Kernel methods do not scale to large data set due to $O(N^2)$ in the number of samples. For example, when large-scale datasets (N>>M) and high accuracy are needed, featurization is very slow and memory consumption is very large (i.e., greater than 500 G).

SUMMARY

In an exemplary embodiment, the present invention provides a computer-implemented random binning featurization process method for a distributed random binning featurization process on one or more multicore systems with a hybrid two-level parallelism, the method including in a training phase, receiving a first data matrix dividing the random binning featurization process into two orthogonal levels, in a high-level generating a randomized number of high-dimension grids and evenly partitioning the grids into nodes in a parallel system, and in a low-level; evenly partitioning dimensions in each grid to construct look-up tables of index vectors and compute a local feature matrix for each node. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-10, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
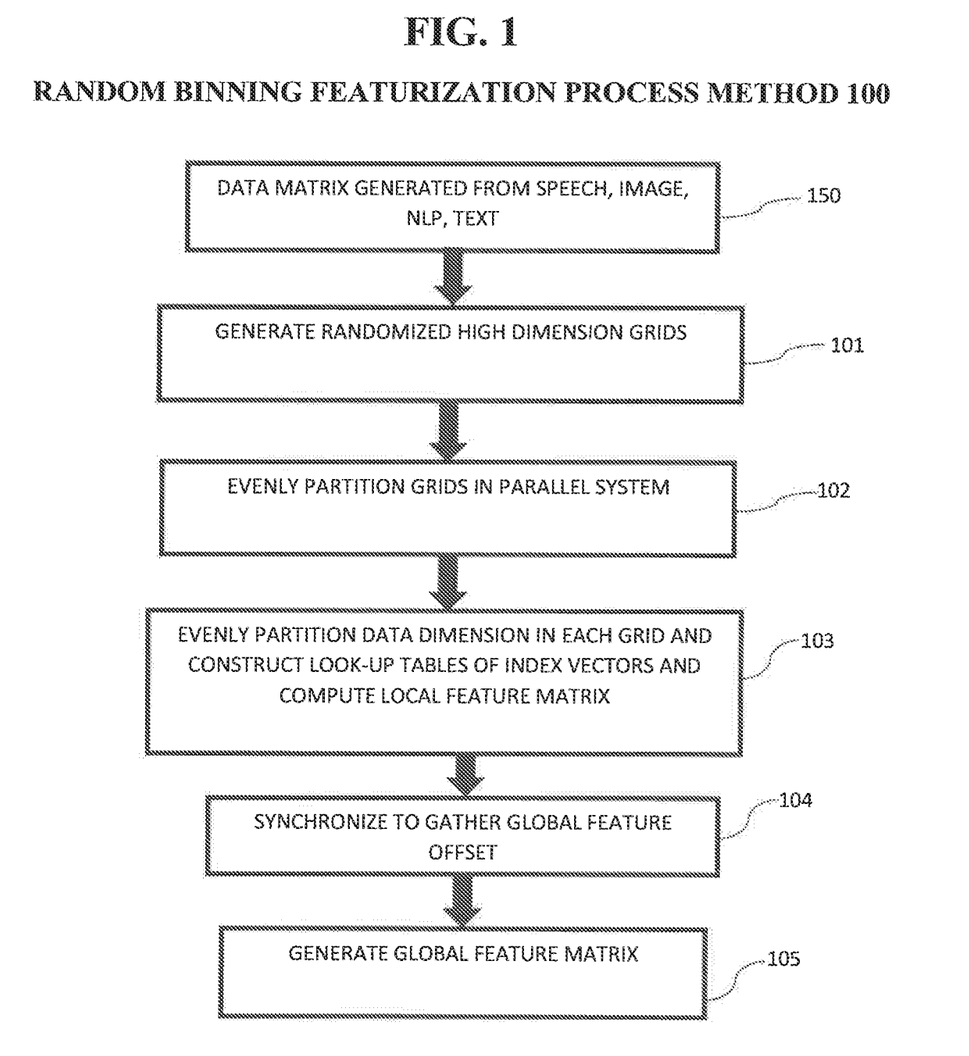
FIG. 1 exemplarily shows a high-level flow chart for a random binning featurization process method 100, in a training phase, according to an embodiment of the present invention.

By way of introduction of the example depicted in FIG. 1, an embodiment of a random binning featurization process method 100 according to the present invention can include various steps for dividing a Random Binning (RB) featurization process into two orthogonal phases (i.e., a high-level phase and a low-level phase) and a near-linear parallelization scheme.

Thus, in the invention, Hybrid two-level parallelism is used to maximize computation speeds and minimize the communication to create a feature matrix.

Figure 7:
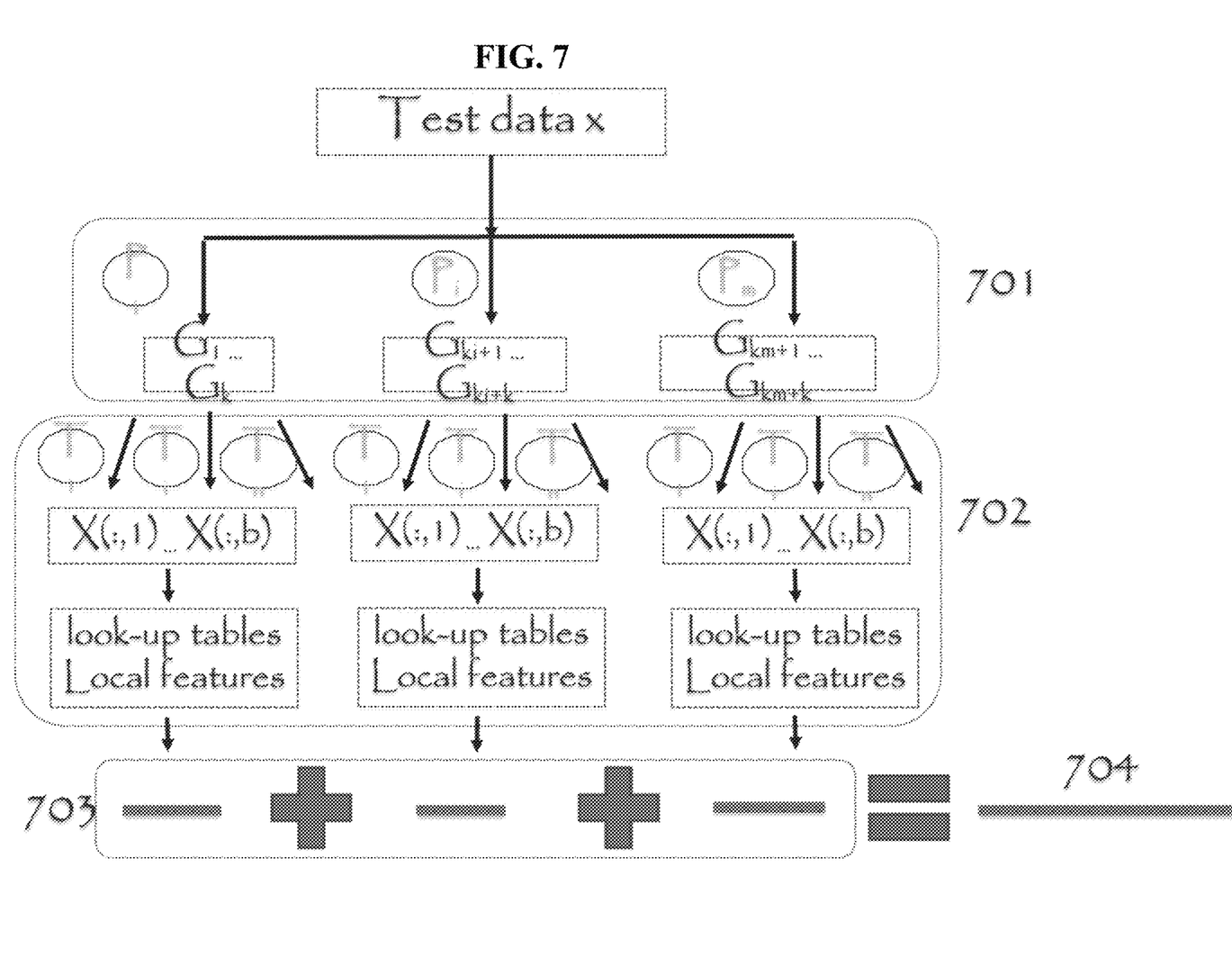
FIG. 7 exemplarily depicts a high-level and a low-level architecture for the training phase of the random binning featurization process method 200, according to an embodiment of the present invention.

By way of introduction of the example depicted in FIG. 7, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 9), it is nonetheless understood that the present invention can be implemented outside of the cloud environment.

Referring to FIGS. 3A-5, FIG. 3A shows how to construct a kernel matrix K based on the input data matrix $X^{N \times d}$. In the kernel approach, let $\chi \subset \mathcal{R}^d$ denote a set where data are drawn from and $\kappa: \chi \times \chi \rightarrow \mathcal{R}$ denote a positive-definite kernel function. For any $\kappa$, there associates a reproducing kernel Hilbert space $H_\kappa$ with inner product $\langle \cdot, \cdot \rangle_{H_\kappa}$. Then, the function $f$ is computed from $H_\kappa$ to minimize the risk function: $f^* = \mathrm{argmin}_{f \in H_\kappa} 1/N \Sigma_{i=1} V(y_i, f(x_i)) + \lambda \|f\|^2_{H_\kappa}$, where V is a loss function, which could be the squared loss $V(y, f(x)) = (y - f(x))^2$ or the hinge loss $\max\{0, 1 - f(x)y\}$.

Figure 3A:
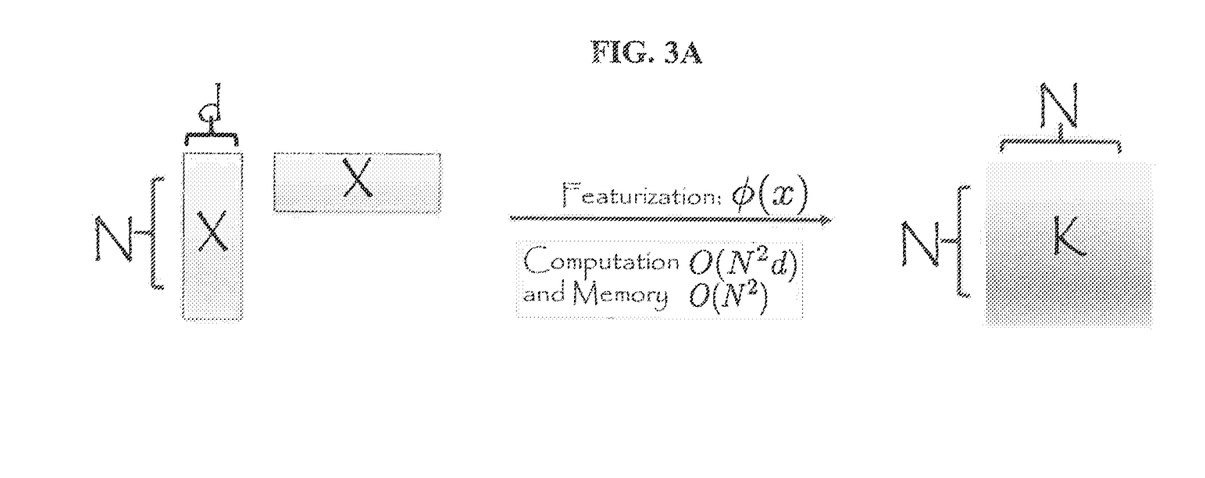
FIG. 3A exemplarily depicts an Exact Kernel Featurization, according to an embodiment of the present invention.
Figure 3B:
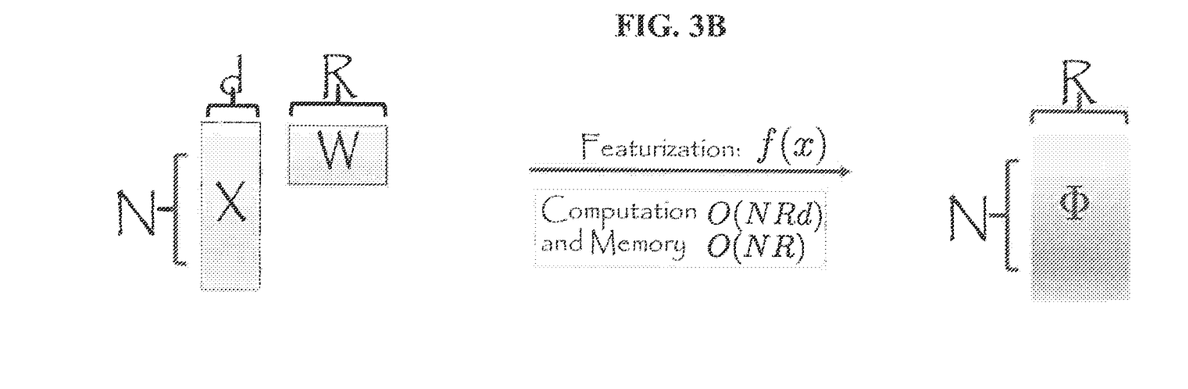
FIG. 3B exemplarily depicts a randomized featurization, according to an embodiment of the present invention.
Figure 4:
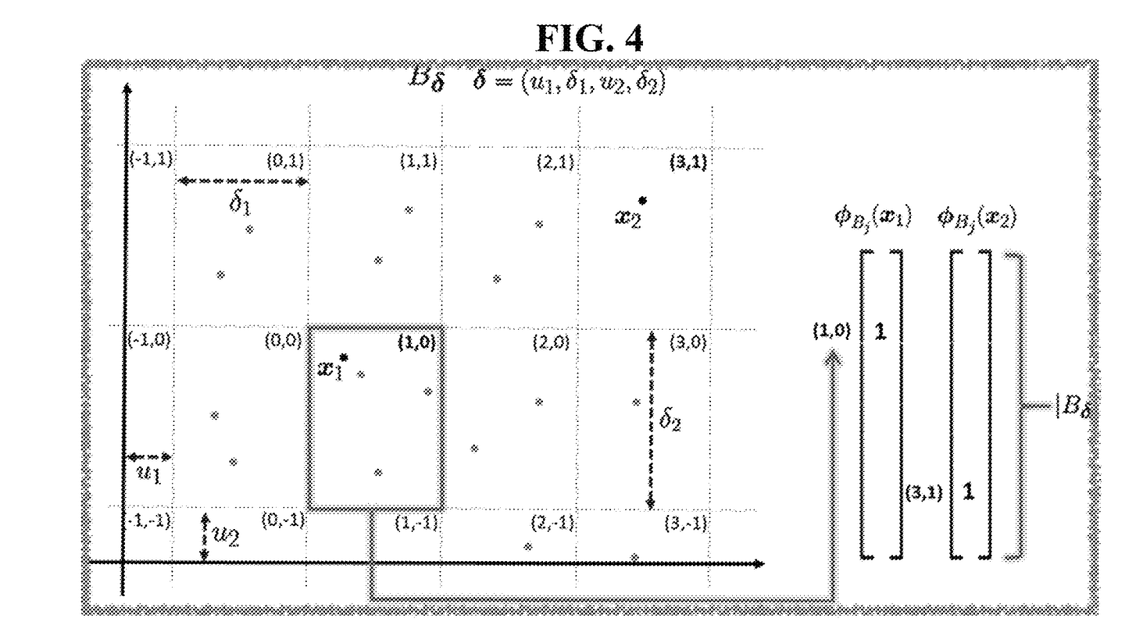
FIG. 4 exemplarily shows a random binning feature map, according to an embodiment of the present invention.
Figure 5:
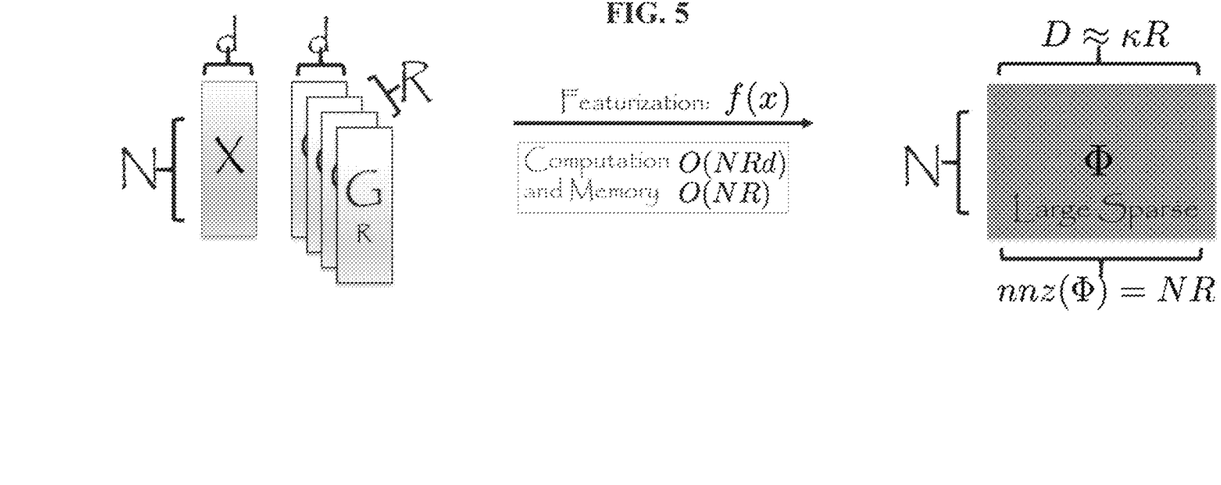
FIG. 5 exemplarily depicts a randomized featurization of a grid in the random binning feature map, according to an embodiment of the present invention.

According to the Representer Theorem, the minimizer is in the form $f(x)=\sum_{i=1}^{} \alpha_i \kappa(x, x_i)$. Therefore, the resulting kernel matrix K can be easily constructed since each element of K is computed by $\kappa(x_i, x_j)$. However, computing a dense kernel matrix K requires at least $O(N^2d)$ computational complexity and $O(N^2+Nd)$ memory storage size. FIG. 3B shows how to compute the feature matrix $\Phi$ using Random Fourier features such that the inner product of the feature matrix approximates well the kernel matrix K. The Random Fourier (RF) features method approximates $\kappa(x_i, x_j)$ by $\kappa_{RF}(x_i, x_j)=2/R \sum_{i=1}^{} \cos(x^T w_i + b_i)\cos(x^T w_j + b_j)$, where R is number of the number of random features, each scalar $b_i$ is an iid sample of uniform$[0, 2\pi]$, and each iid vector $w_i$ is the i-th column of W samples from a distribution associated with probability density of $\kappa$. Random Fourier featurization reduces both the computational complexity to $O(NRd)$ and memory consumption to $O(NR+Nd)$. FIG. 5 shows how to generate the feature matrix $\Phi$ using Random Binning features such that the inner product of the feature matrix approximates well the kernel matrix K. The Random Binning (RB) method has decomposition of the form $k_{RB}(x_i, x_j)=\int_\delta p(\delta)\phi_{B\delta}(x_i)^T\phi_{B\delta}(x_j)d\delta$, where $B_\delta$ is a grid parameterized by $\delta=(\delta_1, u_1, \ldots, \delta_d, u_d)$ that specifies the width and bias of the grid w.r.t the d dimensions, and $B_\delta(x)$ is a vector which has $\phi_b(x_i)=1$, if $b=(\lfloor x_i(1)-u_1/\delta_1 \rfloor, \ldots, (\lfloor x_i(d)-u_d/\delta d \rfloor)$, and $\phi_b(x_i)=0$ otherwise for any $b \in B_\delta$. Note for each grid $B_\delta$, the number of bins $|B_\delta|$ is countably infinite, so $\phi_b(x)$ has infinite dimension but only 1 non-zero entry (at the bin x lies in). A special characteristic of RB compared to other low-rank approximation is the fact that the feature matrix generated by RB is the typically a large, sparse binary matrix $\Phi \in X^{N \times D}$, where D is the total number of non-empty bins generated by using R number of grids G. The value of D is determined by both number of grids R and the kernel width parameter (e.g. $\sigma$ in the case of Laplacian kernel). Using advanced sparse matrix storage technique and iterative solvers, the total computational cost and memory consumption are still in $O(NRd)$ and $O(NR+Nd)$. FIG. 4 illustrates an example when raw dimension of data matrix d=2. The kernel $k_{RB}(x_i, x_j)$ is thus interpreted as the collision probability that two data points xi, xj fall in the same bin, when the grid is generated from distribution $p(\delta)$.

Figure 6:
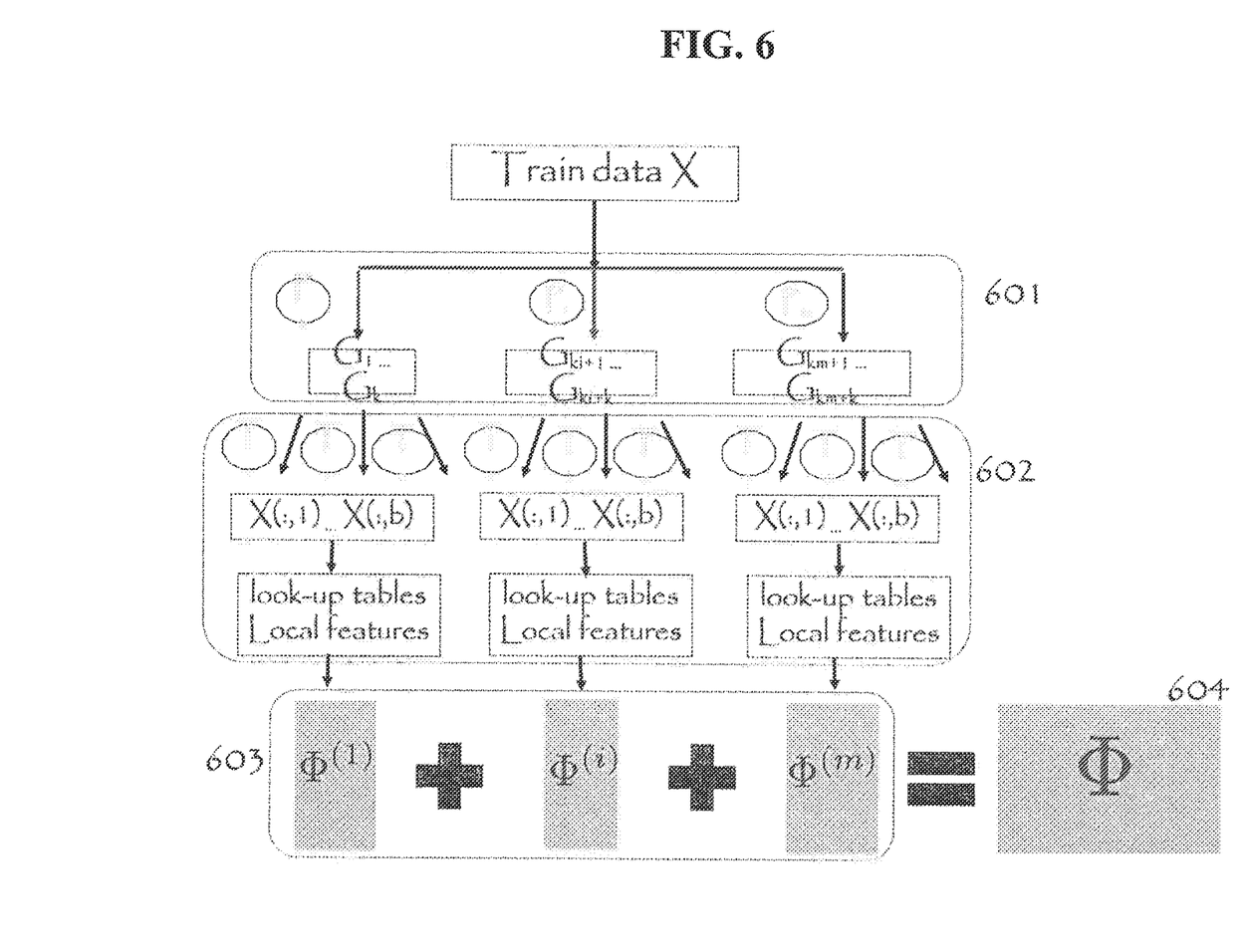
FIG. 6 exemplarily depicts a high-level and a low-level architecture for the training phase of the random binning featurization process method 100, according to an embodiment of the present invention.

Referring now to FIGS. 1 and 6, the method 100 receives a data matrix X 150 (i.e., train data) generated from, for example, speech, an image, natural language processing (NLP), text, etc. Then we compute a feature matrix or vector by using random binning process for both training and testing phases.

In steps 101-102 in a high-level 601, the data matrix x is processed to generate randomized high dimension grids $G_1$, $G_k$, $G_{ki+1}$, $G_{km+k}$, $G_{km+1}$, $G_{km+k}$) an the high dimension grids are evenly partitioned into nodes ($P_1$, $P_i$, $P_m$) in a parallel system. For example, suppose we approximate exact Laplacian kernel using Random Binning. Based on the dimension size d of data matrix, the number of grids that are generated in each computing node is evenly partitioned to achieve a good load balance, For instance, if the total number of R=10000 grids are demanded and we have total computing nodes 100, then each node generates 100 grids where each grid is parameterized by $\delta=(\delta_1, u_1, \ldots, \delta_d, u_d)$ that specifies the width and bias of the grid with respect to the d dimensions. In particular, $(\delta_1, \ldots, \delta_d)$ is sampled from the distribution $p(\delta)$ that is a nonnegative second derivative from a kernel $\kappa$. Each value in $(u_1, \ldots u_d)$ is determined by uniformly sampling between $[0, \delta_i]$. In addition, to generate the various grids with different parameters, we just need to set different random seed to random number generator therefore we do not need communication among the nodes in these steps.

In step 103 in a low-level 602, the dimension in each grid is evenly partitioned to construct look-up tables of index vectors ($T_1$, $T_i$, $T_n$) and to compute local feature matrix $(X(:,1) \ldots X(:,b))$ for each node. In the low-level 602, attributes of X are partitioned and processed, and a look-up table of unique index vectors is built. In particular, in each computing node, each grid generated in this node is processed sequentially. When processing each grid, each dimension of data matrix is computed independently to generate the index position. Therefore, the multiple threads are processed to simultaneously compute the index position for multiple columns. Then the index indicator vector is constructed as $(\lfloor x_i(1)-u_i/\delta_1 \rfloor, \ldots, (\lfloor x_i(d)-u_d/\delta_d \rfloor)$, which is used to search in the current look-up table. If it is found in the look-up table, then the value in the corresponding row of feature matrix is assigned to 1 in the location (the column of feature matrix) when it is hit. Otherwise, this index indicator vector creates a new feature and inserts this vector into the look-up table. During the training stage, a look-up table with unique index indicator vectors are finally created during the construction of the feature matrix for the training set. This look-up table is used later for computing feature vector/matrix for the testing point/set. In this way, each node efficiently generates a local feature matrix while keeping offsets of number of unique features generated by each grid locally.

In step 104, the portioned data is synchronized to gather offset vectors to obtain a global feature offset 603. That is, each look-up table local feature is synchronized into the global feature offsets $\Phi_{(1)}, \Phi_{(i)}, \ldots, \Phi_{(m)}$. This step is the only step that requires communication using the MPI operation like MPI_allgather, which is negligible since the offset vector is small (same as R).

1 In step 105, the global feature matrix $\Phi$604 is generated based on the global feature offsets. After computing the global offsets in each node, the global column index for each local feature is updated to implicitly generate the global feature matrix.

Therefore, steps 101-105 provide a training phase for the data matrix X of which a testing phase (as described later) can be provided in which only a search of new data is required. If the new data is found in the tested data, then the data is assumed relevant. If the new data is not found in the trained data, the new data is not relevant.

Figure 2:
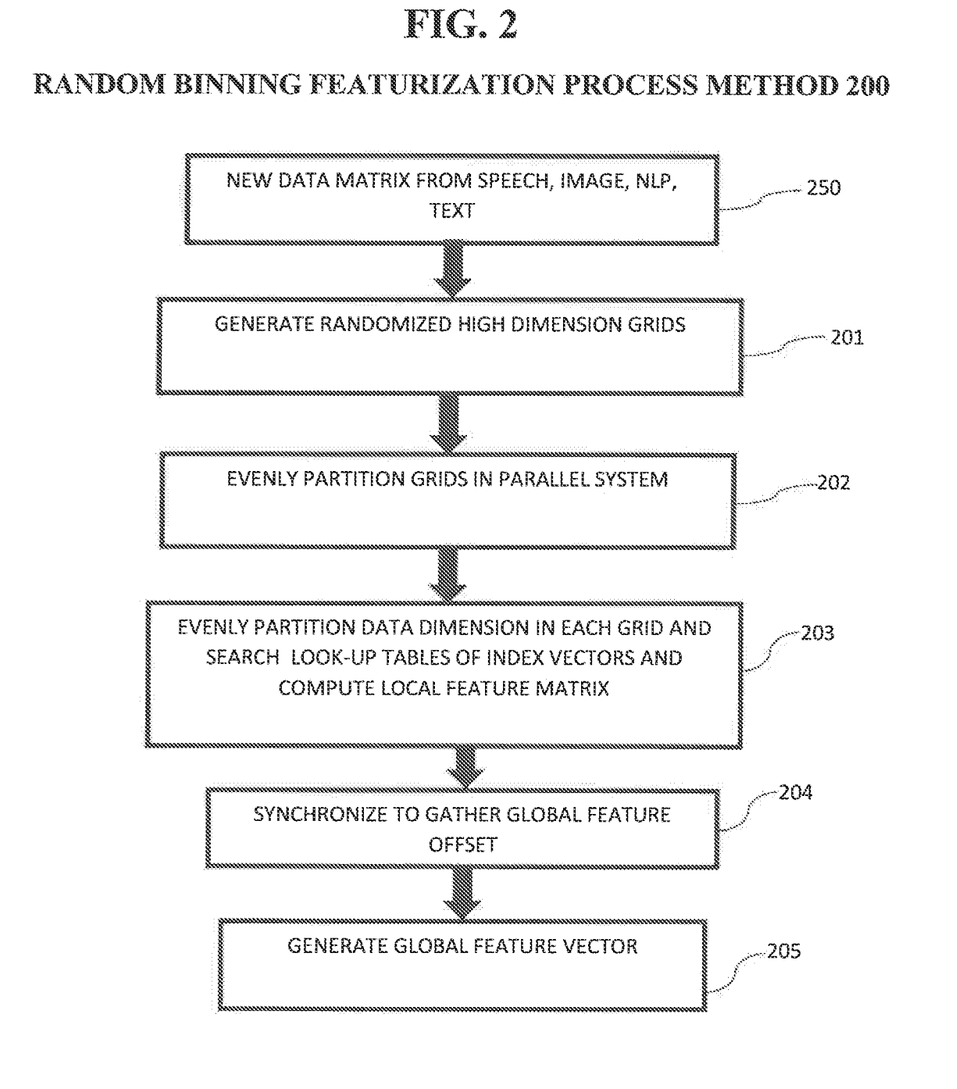
FIG. 2 exemplarily shows a high-level flow chart for a random binning featurization process method 200, in a testing phase, according to an embodiment of the present invention.

Referring now to FIGS. 2 and 7, the method 200 receives a new data matrix X 250 (i.e., test data) generated from, for example, speech, an image, natural language processing (NLP), text, etc.

In steps 201-202 in a high-level 701, the data matrix x is processed to generate randomized high dimension grids and the high dimension grids are evenly partitioned into nodes in a parallel system.

In step 203 in a low-level 702, the dimension in each grid is evenly partitioned to search look-up tables of index vectors and to compute local feature matrix for each node. That is, attributes of X are partitioned and processed, and a search is performed of the look-up table of unique index vectors to compute local feature vectors.

In step 204, the portioned data is synchronized to gather index vectors to obtain a global feature offset 703 and a global feature vector 704 is generated in step 205.

Therefore, the methods 100 and 200 can provide for distributed random binning featurization process on one or more multicore systems with hybrid two-level parallelism with minimum communication across grids to compute global index of feature matrix, where the first level is high level parallel computing and the second level is shared-memory computing in which for train/test data, dividing the random binning featurization process into two orthogonal phases, where in a first phase (i.e., high-level), R number of randomized grid are generated and each grid is processed in parallel systems in a second phase (i.e., low-level), n number of threads are launched to simultaneously process attributes of the train data to construct in the training data and search in the test data local index vector look-up table and compute local feature matrix/vectors, and global feature matrix/vectors can be built by gathering local feature index offset.

Further, the distributed random binning featurization can include a near-linear speedup in both training and testing phases and a near-linear memory reduction for storing local feature matrix.

Thus, the distributed RB featurization method can achieve a near-linear speedup in both training and testing phases, a near-linear memory reduction for storing local feature matrix, and empower the capability of RB for handling very large scale data for a variety of tasks such as classification, regression and clustering.

Thereby, with the invention, high-level parallelism is provided with minimal communication to compute a global index of feature matrices.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
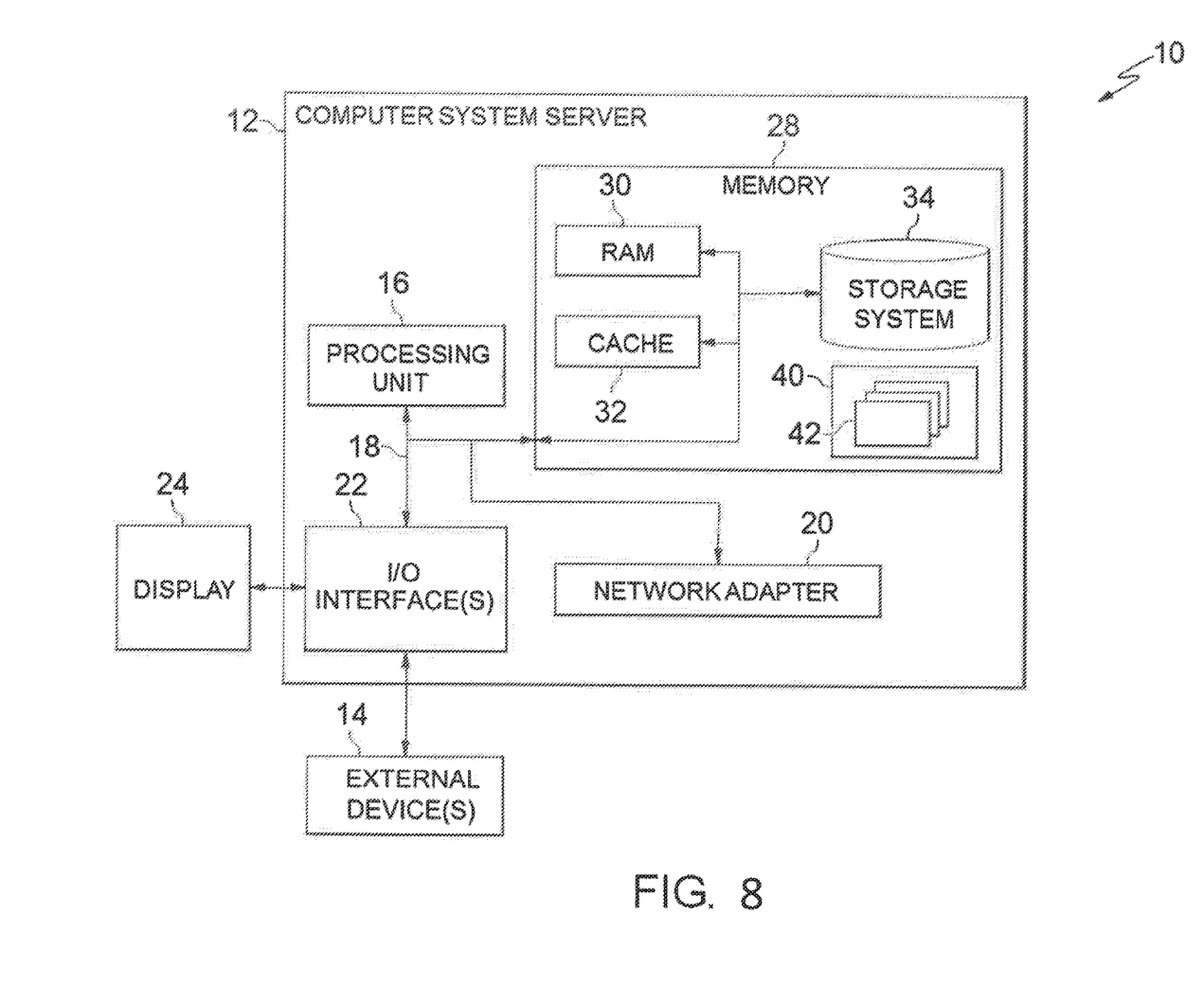
FIG. 8 depicts a cloud-computing node 10 according to an embodiment of the present invention.

Referring now to FIG. 8, a schematic of an example of a cloud computing node is shown. Cloud computing node 10 is only one example of a suitable node and is not intended to suggest any limitation as to the scope of use or functionality of embodiments of the invention described herein.

Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 8, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
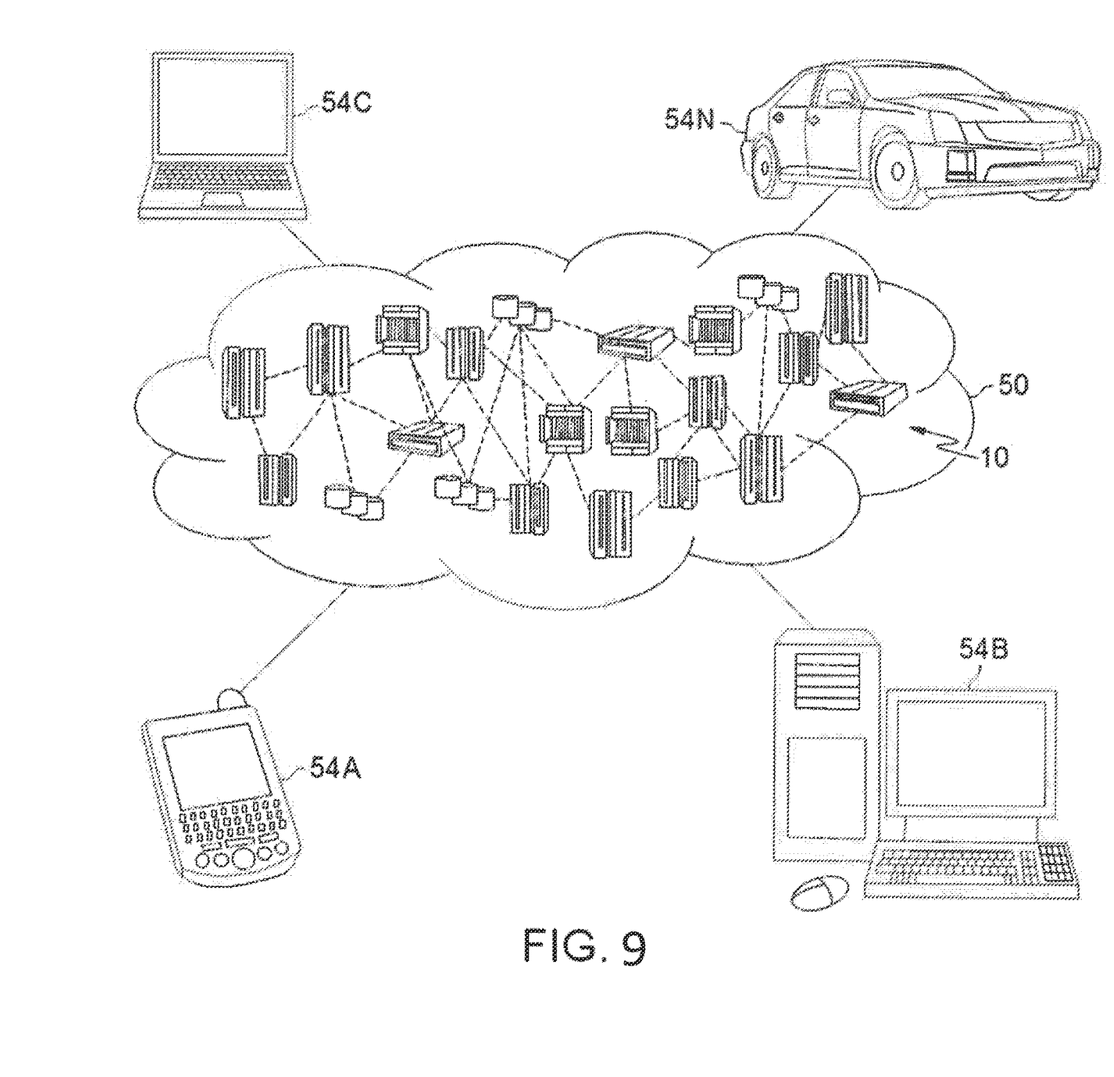
FIG. 9 depicts a cloud-computing environment 50 according to an embodiment of the present invention.

Referring now to FIG. 9, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 9 are intended to be illustrative only and that computing nodes 10 and cloud computing environment 50 can communicate with any type of computerized circuit over any type of network and/or network addressable connection (e.g., using a web browser).

Figure 10:
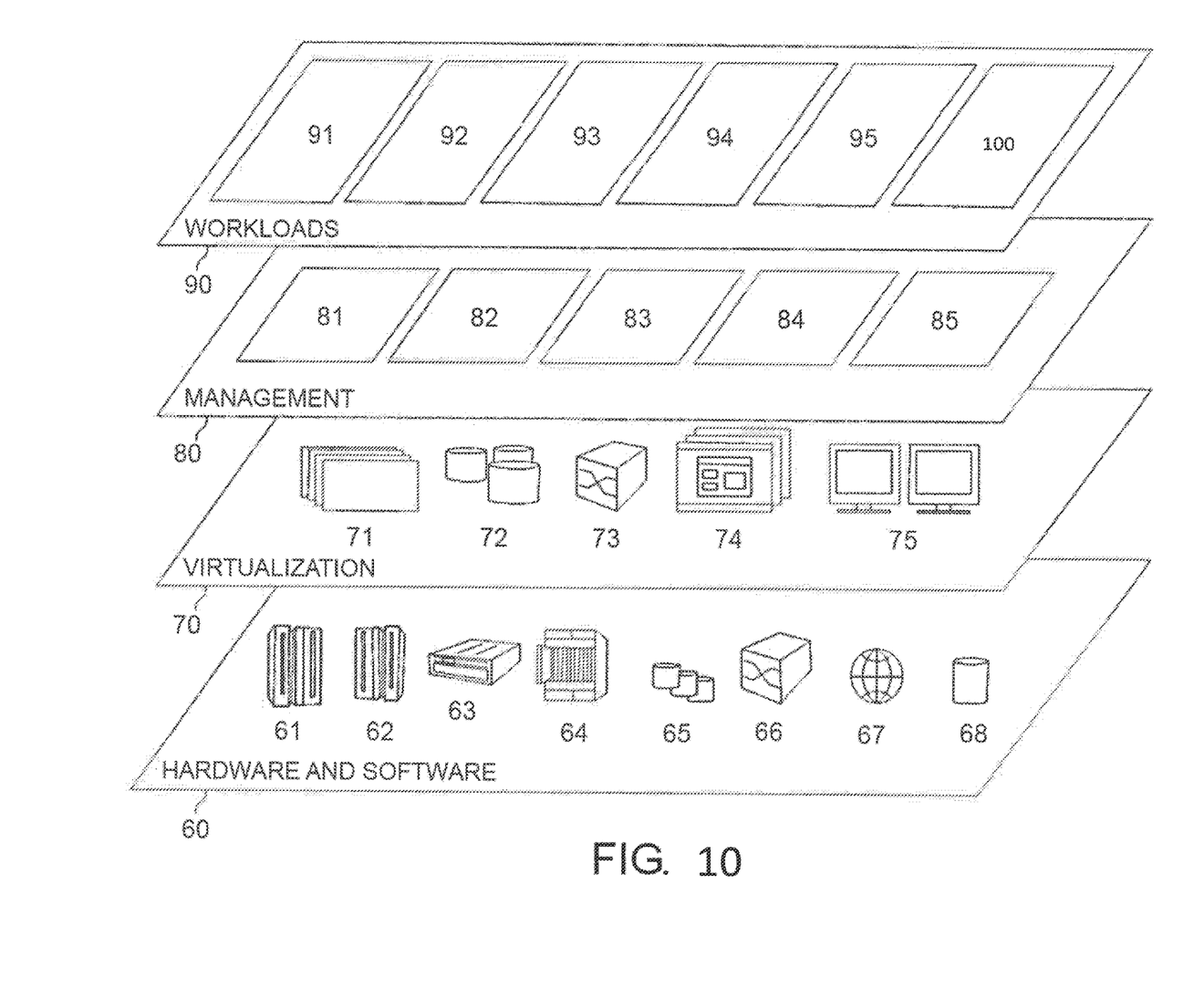
FIG. 10 depicts abstraction model layers according to an embodiment of the present invention.

Referring now to FIG. 10, an exemplary set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and random binning featurization process method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented random binning featurization process method for a distributed random binning featurization process on one or more multicore systems with a hybrid two-level parallelism, the method comprising:
   in a training phase:
      receiving a first data matrix;
      dividing the random binning featurization process into two orthogonal levels comprising a high-level and a low-level;
      in the high-level:
         generating a plurality of randomized grids; and
         evenly partitioning the generating of grids into nodes in a parallel system; and
      in the low-level:
         evenly partitioning dimensions in each grid to construct look-up tables of index vectors and compute a local feature matrix for each node,
   wherein the hybrid two-level parallelism includes random binning and kernel approximations via featurization,
   wherein the random binning has a decomposition of a first form, where a variable in the first form is a grid parameterized by a first function that specifies a width and a bias of a grid with respect to dimensions, and a second variable in the first form is a vector,
   wherein, for each grid of the first form, a number of bins is set so a third variable in the first form has only one non-zero entry, and
   wherein, in the low-level, a number of threads are launched to simultaneously process attributes of the first data matrix to construct the index vector look-up tables and to compute the local feature matrix,
   further comprising:
      synchronizing the local feature matrix for each of the nodes to gather global feature offsets; and
      generating a global feature matrix from all of the global feature offsets,
   wherein the plurality of randomized grids are generated by setting a different random seed to a random number generator, and
   wherein the training phase sets up, the hybrid two-level parallelism to achieve advantages of parallel computing. under constraints of data dependency, the advantages including a near-linear speedup in the training phase and a near-linear memory reduction for storing the local feature matrix.

2. The computer-implemented method of claim 1, further comprising:
   in a testing phase:
      receiving a second data matrix;
      in a high-level of the second data matrix:
         generating a plurality of randomized grids; and
         evenly partitioning the generating of grids into nodes in a parallel system of the second data matrix; and
      in a low-level of the second data matrix:
         evenly partitioning dimensions in each grid to search the look-up tables of index vectors and compute a local feature matrix for each nod;
   wherein the advantages include the near-linear speedup in the testing phase.

3. The computer-implemented method of claim 2, further comprising, in each of the training phase and the testing phase:
   synchronizing local feature matrices t of respective nodes to gather global feature offsets; and
   generating a global feature vector from all of the global feature offsets.

4. The computer-implemented method of claim 2, wherein a global feature matrix and a global feature vector are generated by gathering different respective local feature index offsets.

5. The computer-implemented method of claim 1, embodied in a cloud-computing environment.

6. A computer program product for random binning featurization process for a distributed random binning featurization process on one or more multicore systems with a hybrid two-level parallelism, the computer program product comprising a computer-readable storage medium having program instructions embodied therewith, the program instructions executable by a computer to cause the computer to perform:

in a training phase:
  receiving a first data matrix;
  dividing the random binning featurization process into two orthogonal levels comprising a high-level and a low-level;
  in the high-level:
    generating a plurality of randomized grids; and
    evenly partitioning the generating of grids into nodes in a parallel system; and
  in the low-level:
    evenly partitioning dimensions in each grid to construct look-up tables of index vectors and compute a local feature matrix for each node,
  wherein the hybrid two-level parallelism includes random binning and kernel approximations via featurization, and
  wherein the training phase sets up the hybrid two-level parallelism for parallel computing under constraints of data dependency, and
  wherein the training phase sets up the hybrid two-level parallelism to achieve advantages of parallel computing under constraints of data dependency, the advantages, including a near-linear speedup in the training phase and a near-linear memory reduction for storing the local feature matrix.

7. The computer program product of claim 6, wherein the program instructions are executed by the computer to cause the computer to further perform:
  in a testing phase:
    receiving a second data matrix;
    in a high-level of the second data matrix:
      generating a plurality of randomized grids; and
      evenly partitioning the generating of grids into nodes in a parallel system; and
    in a low-level of the second data matrix:
      evenly partitioning dimensions in each grid to search the look-up tables of index vectors and compute a local feature matrix for each nod;
  wherein the advantages include the near-linear speedup in the testing phase.

8. The computer program product of claim 7, further comprising, in each of the training phase and the testing phase:
  synchronizing local feature matrices t of respective nodes to gather global feature offsets; and
  generating a global feature vector from all of the global feature offsets.

9. The computer program product of claim 7, wherein a global feature matrix and a global feature vector are generated by gathering different respective local feature index offsets.

10. A random binning featurization process system for a distributed random binning featurization process on one or more multicore systems with a hybrid two-level parallelism, said system comprising:
  a processor; and
  a memory, the memory storing instructions to cause the processor to perform:
    in a training phase:
      receiving a first data matrix;
      dividing the random binning featurization process into two orthogonal levels comprising a high-level and a low-level;
      in the high-level:
        generating a plurality of randomized grids; and
        evenly partitioning the generating of grids into nodes in a parallel system; and
      in the low-level:
        evenly partitioning dimensions in each grid to construct look-up tables of index vectors and compute a local feature matrix for each node,
    wherein the hybrid two-level parallelism includes random binning and kernel approximations via featurization,
    wherein the random binning has a decomposition of a first form $k_{RB}(x_i, x_j) = \int_\delta p(\delta)\, \phi_{B\delta}(x_i)^T \phi_{B\delta}(x_j) d\delta$, where $B_\delta$ is a grid parameterized by $\delta = (\delta_1, u_1, \ldots, \delta_d, u_d)$ that specifies a width and a bias of a grid with respect to d dimensions, and $B_\delta(x)$ is a vector which has $\phi_b(x_i) = 1$, if $b = \lfloor (x_i(1)-u_1/\delta_1 \rfloor, \ldots, \lfloor (x_i(d)-u_d/\delta d \rfloor)$, and $\phi_b(x_i) = 0$ otherwise for any $b \in B_\delta$,
    wherein, for each grid $B_\delta$, a number of bins $|B_\delta|$ is set so $\phi_b(x)$ has only 1 non-zero entry, and
    wherein, in the low-level, a number of threads are launched to simultaneously process attributes of the first data matrix to construct the index vector look-up tables and to compute the local feature matrix,
  further comprising:
    synchronizing the local feature matrix for each of the nodes to gather global feature offsets; and
    generating a global feature matrix from all of the global feature offsets,
  wherein the plurality of randomized grids are generated by setting a different random seed to a random number generator,
  wherein the training phase sets up the hybrid two-level parallelism to achieve advantages of parallel computing under constraints of data dependency the advantages including a near-linear speedup in the training phase and a near-linear memory reduction for storing the local feature matrix.

11. The system of claim 10, wherein the memory further stores instructions to cause the processor to perform:
  in a testing phase:
    receiving a second data matrix;
    in a high-level of the second data matrix:
      generating a plurality of randomized grids; and
      evenly partitioning the generating of grids into nodes in a parallel system; and
    in a low-level of the second data matrix:
      evenly partitioning dimensions in each grid to search the look-up tables of index vectors and compute a local feature matrix for each node,
  wherein the advantages include the near-linear speedup in the testing phase.

12. The system of claim 11, wherein the memory further stores instructions to cause the processor to perform, in each of the training phase and the testing phase:
  synchronizing local feature matrices t of respective nodes to gather global feature offsets; and
  generating a global feature vector from all of the global feature offsets.

13. The system of claim 11, wherein a global feature matrix and a global feature vector are generated by gathering different respective local feature index offsets.

14. The system of claim 10, embodied in a cloud-computing environment.

* * * * *